United States Patent
Ramaswamy et al.

(10) Patent No.: US 12,549,465 B2
(45) Date of Patent: *Feb. 10, 2026

(54) AUTONOMOUS DISTRIBUTED FORWARDING PLANE TRACEABILITY BASED ANOMALY DETECTION IN APPLICATION TRAFFIC FOR HYPER-SCALE SD-WAN

(71) Applicant: VeloCloud Networks, LLC, Santa Clara, CA (US)

(72) Inventors: Navaneeth Krishnan Ramaswamy, Chennai (IN); Sivakumar Somasundaram, Chennai (IN); Varsha Venkata Krishnan, Coimbatore (IN); Shivaram Rammohan, Virudhunagar (IN); Hari Narayan Gopalan, Madurai (IN)

(73) Assignee: VeloCloud Networks, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,688

(22) Filed: Jan. 28, 2023

(65) Prior Publication Data
US 2023/0179502 A1 Jun. 8, 2023

Related U.S. Application Data

(63) Continuation of application No. 17/143,094, filed on Jan. 6, 2021, now Pat. No. 11,575,591.

(30) Foreign Application Priority Data
Nov. 17, 2020 (IN) .............................. 202041050012

(51) Int. Cl.
*H04L 43/10* (2022.01)
*H04L 12/28* (2006.01)
(Continued)

(52) U.S. Cl.
CPC .......... *H04L 43/10* (2013.01); *H04L 12/2854* (2013.01); *H04L 41/0627* (2013.01);
(Continued)

(58) Field of Classification Search
None
See application file for complete search history.

(56) References Cited

U.S. PATENT DOCUMENTS

| | | | |
|---|---|---|---|
| 5,652,751 A | 7/1997 | Sharony | |
| 5,909,553 A | 6/1999 | Campbell et al. | |

(Continued)

FOREIGN PATENT DOCUMENTS

| | | |
|---|---|---|
| CN | 1926809 A | 3/2007 |
| CN | 102577270 A | 7/2012 |

(Continued)

OTHER PUBLICATIONS

Author Unknown, "VeloCloud Administration Guide: VMware SD-WAN by VeloCloud 3.3," Month Unknown 2019, 366 pages, VMware, Inc., Palo Alto, CA, USA.

(Continued)

*Primary Examiner* — Joshua Joo
(74) *Attorney, Agent, or Firm* — BainwoodHuang

(57) ABSTRACT

Some embodiments of the invention provide a method for detecting and remediating anomalies in an SD-WAN that includes a controller, an enterprise datacenter, and multiple branch sites each having at least one edge node that includes a set of packet processing stages. At the controller, the method receives from a particular node of a particular branch site a flow notification indicating detection of an anomaly on the particular node. Based on the anomaly, the method dynamically generates trace monitoring rules that specify one or more flows to be traced and provides the trace monitoring rules to the particular node and at least one other (Continued)

node of another branch site. From the particular node and the at least one other node, the method receives trace monitoring results collected in response to the provided trace monitoring rules, and analyzes the results to identify any anomalies and dynamic actions to correct the anomalies.

20 Claims, 13 Drawing Sheets

(51) Int. Cl.
  *H04L 41/0604* (2022.01)
  *H04L 41/22* (2022.01)
  *H04L 43/06* (2022.01)
  *H04L 43/0817* (2022.01)
  *H04L 43/0852* (2022.01)

(52) U.S. Cl.
  CPC .............. *H04L 41/22* (2013.01); *H04L 43/06* (2013.01); *H04L 43/0817* (2013.01); *H04L 43/0852* (2013.01)

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,890,447 B2 * | 2/2011 | Abels ................... G06N 5/025 706/47 |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin, III et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,015,299 B1 | 4/2015 | Shah |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,542,219 B1 | 1/2017 | Bryant et al. |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,692,714 B1 | 6/2017 | Nair et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,200,279 B1 * | 2/2019 | Aljaedi ................... H04L 43/20 |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |

(56) References Cited

U.S. PATENT DOCUMENTS

| | | |
|---|---|---|
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,482 B2 | 2/2020 | Oré et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,630,505 B2 | 4/2020 | Rubenstein et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,708,144 B2 | 7/2020 | Mohan et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,595 B2 | 8/2021 | Knutsen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,146,632 B2 | 10/2021 | Rubenstein |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 * | 9/2022 | Ramaswamy ...... H04L 43/0817 |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,522,780 B1 | 12/2022 | Wallace et al. |
| 11,526,434 B1 | 12/2022 | Brooker et al. |
| 11,533,248 B2 | 12/2022 | Mayya et al. |
| 11,552,874 B1 | 1/2023 | Pragada et al. |
| 11,575,591 B2 * | 2/2023 | Ramaswamy ...... H04L 12/2854 |
| 11,575,600 B2 | 2/2023 | Markuze et al. |
| 11,582,144 B2 | 2/2023 | Ramaswamy et al. |
| 11,582,298 B2 | 2/2023 | Hood et al. |
| 11,601,356 B2 | 3/2023 | Gandhi et al. |
| 11,606,225 B2 | 3/2023 | Cidon et al. |
| 11,606,286 B2 | 3/2023 | Michael et al. |
| 11,606,314 B2 | 3/2023 | Cidon et al. |
| 11,606,712 B2 | 3/2023 | Devadoss et al. |
| 11,611,507 B2 | 3/2023 | Ramaswamy et al. |
| 11,637,768 B2 | 4/2023 | Ramaswamy et al. |
| 11,677,720 B2 | 6/2023 | Mayya et al. |
| 11,689,959 B2 | 6/2023 | Devadoss et al. |
| 11,700,196 B2 | 7/2023 | Michael et al. |
| 11,706,126 B2 | 7/2023 | Silva et al. |
| 11,706,127 B2 | 7/2023 | Michael et al. |
| 11,709,710 B2 | 7/2023 | Markuze et al. |
| 11,716,286 B2 | 8/2023 | Ramaswamy et al. |
| 11,722,925 B2 | 8/2023 | Devadoss et al. |
| 11,729,065 B2 | 8/2023 | Ramaswamy et al. |
| 2002/0049687 A1 | 4/2002 | Helsper et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 * | 7/2005 | Navada ............ H04L 43/10 709/200 |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0034335 A1 | 2/2006 | Karaoguz et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |

(56) References Cited

U.S. PATENT DOCUMENTS

| | | |
|---|---|---|
| 2006/0193252 A1 | 8/2006 | Naseh et al. |
| 2006/0195605 A1 | 8/2006 | Sundarrajan et al. |
| 2006/0245414 A1 | 11/2006 | Susai et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0195797 A1 | 8/2007 | Patel et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1* | 5/2010 | Srinivasmurthy ...... H04L 41/12 370/221 |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0149736 A1* | 6/2011 | Kashyap ............ H04L 63/1416 370/235 |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |

(56) References Cited

U.S. PATENT DOCUMENTS

| | | |
|---|---|---|
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0319057 A1* | 11/2015 | Jocha .................. H04L 43/062 370/241.1 |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |

(56) References Cited

U.S. PATENT DOCUMENTS

| | | |
|---|---|---|
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048126 A1* | 2/2017 | Handige Shankar ... H04L 41/40 |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0111246 A1* | 4/2017 | Shaw ............... H04L 43/20 |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |

(56) References Cited

U.S. PATENT DOCUMENTS

| | | |
|---|---|---|
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1* | 10/2019 | Degioanni ............... H04L 63/20 |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0252324 A1* | 8/2020 | Sanchez Charles .... H04L 45/02 |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0336360 A1* | 10/2020 | Ward ..................... H04L 41/342 |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |

(56) References Cited

U.S. PATENT DOCUMENTS

| | | | |
|---|---|---|---|
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1* | 5/2021 | C H ........ H04L 41/40 |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0392477 A1* | 12/2021 | Taft ........ H04W 12/37 |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1* | 2/2022 | Liu ........ H04L 43/12 |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1* | 4/2022 | Hooda ........ H04L 47/70 |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerstrom et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0063480 A1* | 3/2023 | R. ........ G06F 9/547 |
| 2023/0105680 A1 | 4/2023 | Simlai et al. |
| 2023/0121871 A1 | 4/2023 | Mayya et al. |
| 2023/0179445 A1 | 6/2023 | Cidon et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |

FOREIGN PATENT DOCUMENTS

| | | | |
|---|---|---|---|
| CN | 102811165 A | 12/2012 |
| CN | 104956329 A | 9/2015 |
| CN | 106230650 A | 12/2016 |
| CN | 106656847 A | 5/2017 |
| CN | 106998284 A | 8/2017 |
| CN | 110447209 A | 11/2019 |
| CN | 111198764 A | 5/2020 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| JP | 2002368792 A | 12/2002 |
| JP | 2010233126 A | 10/2010 |
| JP | 2014200010 A | 10/2014 |
| JP | 2017059991 A | 3/2017 |
| JP | 2017524290 A | 8/2017 |

(56) References Cited

FOREIGN PATENT DOCUMENTS

| KR | 20170058201 A | 5/2017 |
|---|---|---|
| RU | 2574350 C2 | 2/2016 |
| WO | 03073701 A1 | 9/2003 |
| WO | 2005071861 A1 | 8/2005 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2016123314 A1 | 8/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | 2021211906 A1 | 10/2021 |
| WO | 2022005607 A1 | 1/2022 |
| WO | 2022082680 A1 | 4/2022 |
| WO | 2022154850 A1 | 7/2022 |
| WO | 2022159156 A1 | 7/2022 |
| WO | 2022231668 A1 | 11/2022 |
| WO | 2022235303 A1 | 11/2022 |
| WO | 2022265681 A1 | 12/2022 |
| WO | 2023009159 A1 | 2/2023 |

OTHER PUBLICATIONS

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Guo, Xiangyi, et al., (U.S. Appl. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

Non-Published Commonly Owned U.S. Appl. No. 17/976,784, filed Oct. 29, 2022, 55 pages, VMware, Inc.

Non-Published Commonly Owned U.S. Appl. No. 18/083,536, filed Dec. 18, 2022, 27 pages, VMware, Inc.

Non-Published Commonly Owned U.S. Appl. No. 18/102,685, filed Jan. 28, 2023, 124 pages, VMware, Inc.

Non-Published Commonly Owned U.S. Appl. No. 18/102,687, filed Jan. 28, 2023, 172 pages, VMware, Inc.

Non-Published Commonly Owned U.S. Appl. No. 18/102,689, filed Jan. 28, 2023, 46 pages, VMware, Inc.

Non-Published Commonly Owned U.S. Appl. No. 15/803,964, filed Nov. 6, 2017, 15 pages, The Mode Group.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Taleb, Tarik, "D4.1 Mobile Network Cloud Component Design," Mobile Cloud Networking, Nov. 8, 2013, 210 pages, MobileCloud

(56) References Cited

OTHER PUBLICATIONS

Networking Consortium, retrieved from http://www.mobile-cloud-networking.eu/site/index.php?process=download&id=127&code=89d30565cd2ce087d3f8e95f9ad683066510a61f.

Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.

Valtulina, Luca, "Seamless Distributed Mobility Management (DMM) Solution in Cloud Based LTE Systems," Master Thesis, Nov. 2013, 168 pages, University of Twente, retrieved from http:/essay.utwente.nl/64411/1/Luca_Valtulina_MSc_Report_final.pdf.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Non-Published Commonly Owned U.S. Appl. No. 18/197,090, filed May 14, 2023, 36 pages, Nicira, Inc.

Non-Published Commonly Owned U.S. Appl. No. 18/222,864, filed Jul. 17, 2023, 350 pages, VMware, Inc.

Non-Published Commonly Owned U.S. Appl. No. 18/222,868, filed Jul. 17, 2023, 22 pages, VMware, Inc.

Non-Published Commonly Owned U.S. Appl. No. 18/224,466, filed Jul. 20, 2023, 56 pages, VMware, Inc.

Non-Published Commonly Owned U.S. Appl. No. 18/235,879, filed Aug. 20, 2023, 173 pages, VMware, Inc.

\* cited by examiner

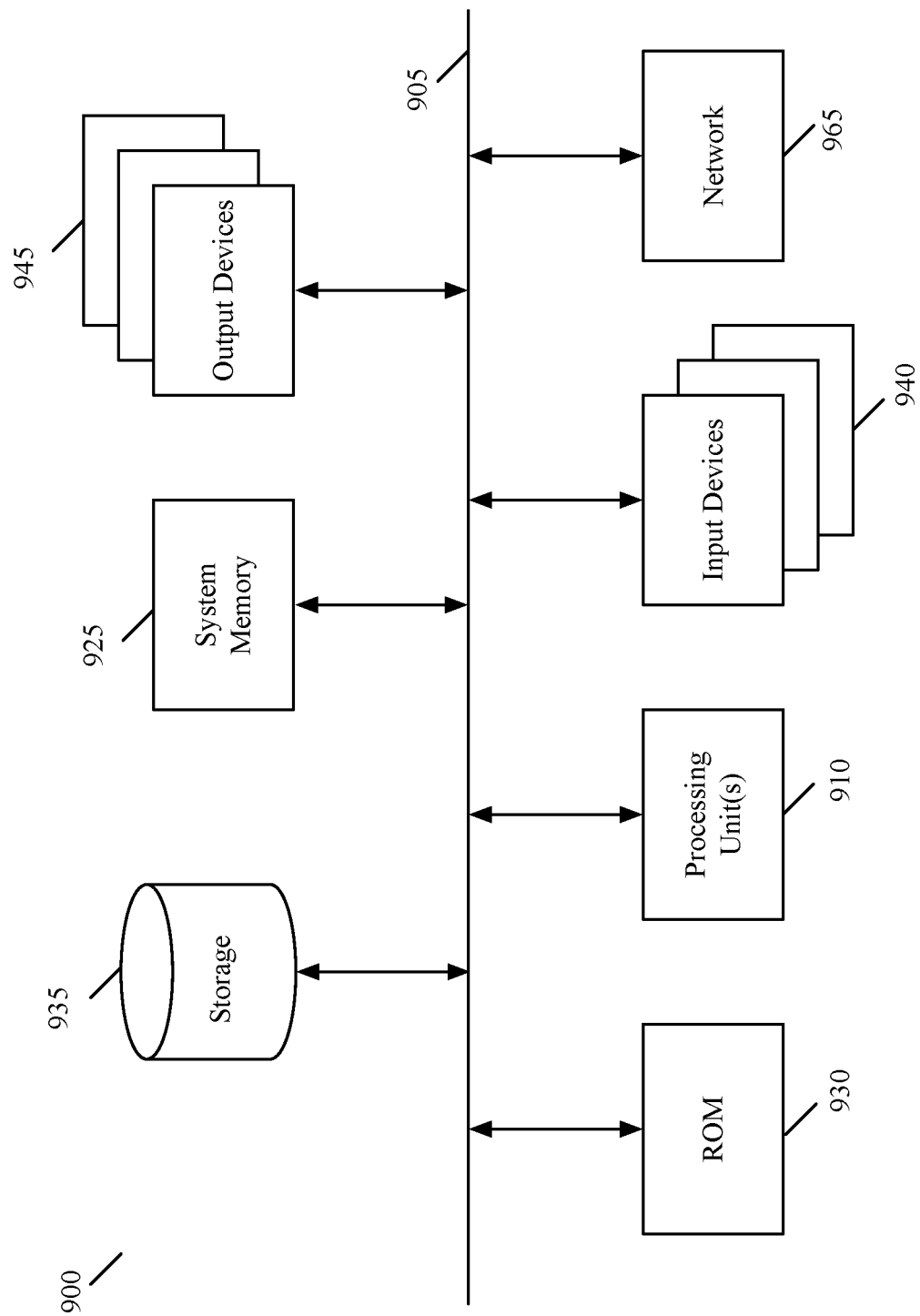

AUTONOMOUS DISTRIBUTED FORWARDING PLANE TRACEABILITY BASED ANOMALY DETECTION IN APPLICATION TRAFFIC FOR HYPER-SCALE SD-WAN

CLAIM OF BENEFIT TO PRIOR APPLICATIONS

This application is a continuation application of U.S. patent application Ser. No. 17/143,094, filed Jan. 6, 2021, now published as U.S. Patent Publication 2022/0158924. U.S. patent application Ser. No. 17/143,094 claims priority to Indian Provisional Patent Application 202041050012, filed Nov. 17, 2020. U.S. patent application Ser. No. 17/143,094, now published as U.S. Patent Publication 2022/0158924, is incorporated herein by reference.

BACKGROUND

Today, exponential growth of software-defined wide area networks (SD-WANs) results in large numbers of distributed nodes that form complex overlay networks. These thousands of nodes that handle application traffic can experience a multitude of issues in the form of traffic impairments and performance degradation over a period of time. These large SD-WANs present various challenges for isolating and identifying issues relating to various packet flows such as a lack of time and energy to co-relate issues across thousands of SD-WAN nodes. Traditional methods for tracking and tracing failures across various traffic paths involves capturing debug logs by establishing multiple direct SSH sessions to each node across the entire SD-WAN network path relating to the traffic. Furthermore, current implementations do not provide any way to dynamically isolate out all occurrences of similar anomalies in application traffic across all of the nodes in an enterprise at the same time.

BRIEF SUMMARY

Some embodiments of the invention provide a method for detecting and remediating anomalies in a software-defined wide area network (SD-WAN) that includes at least a controller (e.g., a VeloCloud Orchestrator (VCO)), an enterprise datacenter, and multiple branch sites. Each of the branch sites in the SD-WAN includes at least one edge node that includes a set of packet processing stages for processing packet flows in the SD-WAN. In some embodiments, a particular node receives, from the controller, a set of one or more trace monitoring rules specified for a particular packet flow. The particular node determines that a first packet received at the particular node belongs to the particular packet flow and matches at least one trace monitoring rule. Based on these determinations, the particular node specifies the first packet as a packet that should be trace monitored by each packet processing stage of the particular node. As the first packet is processed by each packet processing stage, the particular node generates trace monitoring results to be provided to the controller for analysis.

In some embodiments, the packet processing stages include an ingress stage, a firewall stage, a routing stage, a quality of service (QoS) stage, a network address translation (NAT) stage, and an egress stage. The ingress stage, in some embodiments, is responsible for determining whether packets received at the particular node belong to a packet flow that is marked for trace monitoring and whether these packets match at least one trace monitoring rule. When a packet matches at least one trace monitoring rule in some embodiments, the ingress stage marks the packet (e.g., sets a flag on the packet) in order to identify the packet to the remaining packet processing stages as a packet that should be trace monitored. In addition to the trace monitoring rules, some embodiments also define a set of exceptions specifying thresholds, which, when met, are indicative of an anomaly. For example, some embodiments define exception rules specifying a threshold for a number of dropped packets.

As each of the packet processing stages processes a packet marked for trace monitoring by the ingress stage, they generate trace monitoring data and provide this data to a trace monitor agent executing on the particular node, according to some embodiments. The trace monitor agent, in some embodiments, aggregates the received data and provides aggregated trace monitoring results on a per-flow basis to the controller for analysis. In some embodiments, the trace monitor agent provides the results to the controller via a control plane of the particular node on which the trace monitor agent executes. The trace monitor agent only provides the trace monitoring results to the controller after trace monitoring for a packet flow has been completed on the node (e.g., after a number of packets specified for trace monitoring have been processed), according to some embodiments.

Some embodiments also include a hierarchical order of expansion for anomaly detection. In other words, the controller can generate trace monitoring rules in a hierarchical order so that dynamic anomaly detection can be grouped based on, for example, customer need. At the flow level, trace monitoring rules in some embodiments can be specified to target a particular packet flow across nodes in the SD-WAN. At the application level, the controller in some embodiments targets a packet flows to or from a specific application. In some embodiments, the controller may generate trace monitoring rules at the profile level such that all nodes belonging to a specified profile receive the trace monitoring rules. Lastly, in some embodiments, the controller may generate trace monitoring rules at the enterprise level for all of the nodes in an enterprise.

After receiving trace monitoring results from a node, the controller in some embodiments analyzes the results to identify any anomalies. Also, in some embodiments, the controller determines one or more remedial actions for correcting the identified anomalies. The controller performs the one or more dynamic actions to correct the identified anomalies in some embodiments, or pushes the dynamic actions to one or more nodes to apply in order to correct the identified anomalies.

In some embodiments, the controller generates trace monitoring rules in response to receiving a notification from one or more nodes indicating anomalies have been detected on the one or more nodes. Alternatively, or conjunctively, some embodiments provide a user interface (UI) to allow users to request trace monitoring for specific packet flows, nodes, etc. In some such embodiments, after the controller has received results from the nodes (i.e., in response to having provided trace monitoring rules in accordance with a user request), it provides a display through the UI that includes a visualization of the nodes involved in the trace monitoring, their packet processing stages, and paths traversed by packets and packet flows between these nodes.

The visualization in the provided display, in some embodiments, provides tools for identifying and, in some embodiments, remediating any detected anomalies. For example, any nodes, packet processing stages, and paths for which an anomaly has been detected may appear in a color (e.g., red) that is different from another color (e.g., green) in which the nodes, packet processing stages, and paths for which no anomalies have been detected appear.

Additionally, some embodiments allow a user to select individual packet processing stages to see information (e.g., in a pop-up window) regarding the packet flow processed by the stage when the anomaly was detected as well as a description of the error or anomaly experienced on that stage. More specifically, the packet flow information includes source and destination network addresses, source and destination ports, and application ID, according to some embodiments. The remainder of the information in some embodiments includes time elapsed, and stage status (i.e., pass or fail), according to some embodiments. As mentioned above, some embodiments may also include a remedial action, selectable by the user, to correct the detected anomaly.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 9 conceptually illustrates a computer system with which some embodiments of the invention are implemented.

DETAILED DESCRIPTION

Figure 1:
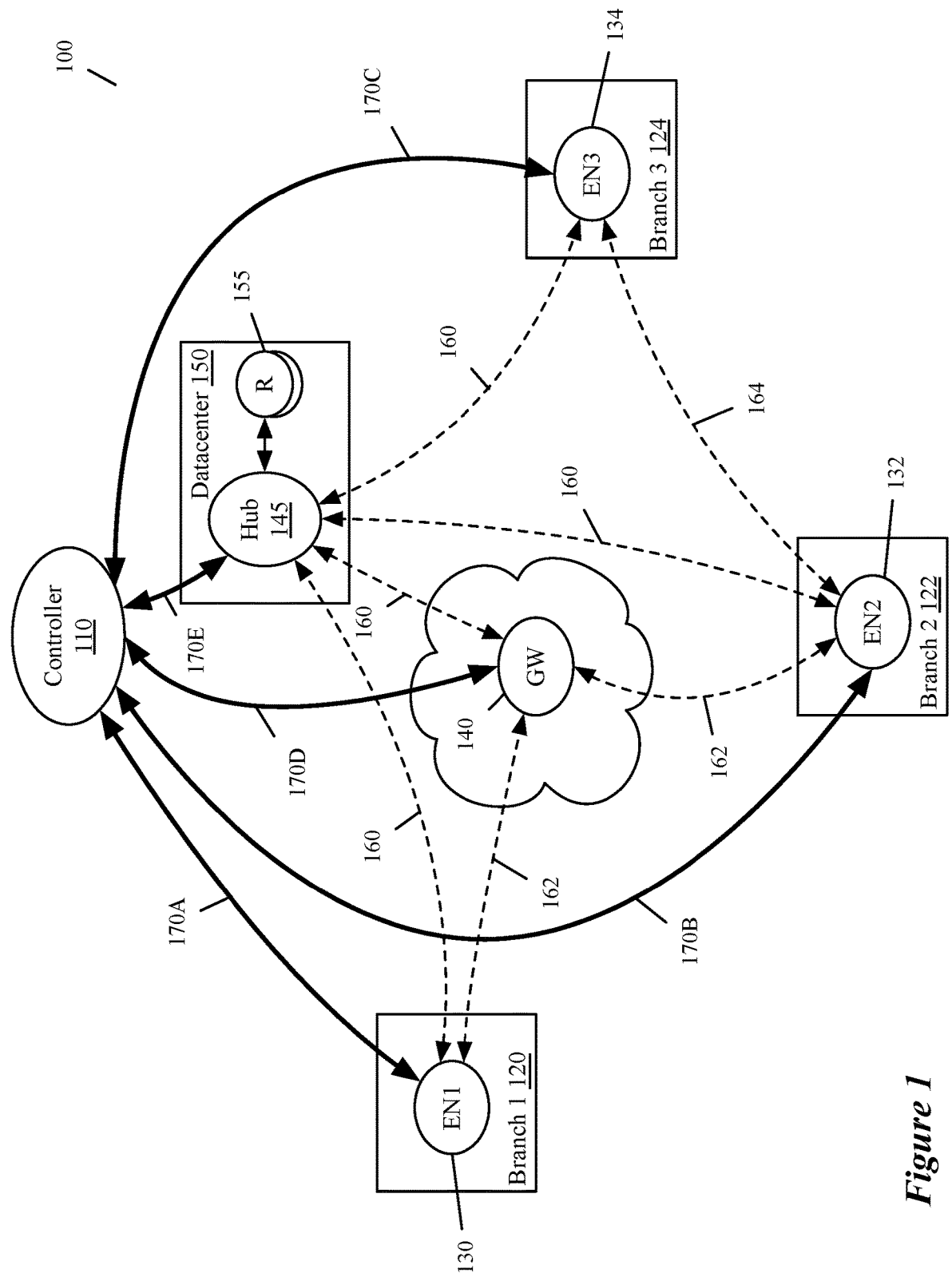
FIG. 1 conceptually illustrates an SD-WAN that includes multiple branch sites, a controller, and a datacenter hub, according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for detecting and remediating anomalies in a software-defined wide area network (SD-WAN) that includes at least a controller (e.g., a VeloCloud Orchestrator (VCO)), an enterprise datacenter, and multiple branch sites. Each of the branch sites in the SD-WAN includes at least one edge node that includes a set of packet processing stages for processing packet flows in the SD-WAN. In some embodiments, a particular node receives, from the controller, a set of one or more trace monitoring rules specified for a particular packet flow. The particular node determines that a first packet received at the particular node belongs to the particular packet flow and matches at least one trace monitoring rule. Based on these determinations, the particular node specifies the first packet as a packet that should be trace monitored by each packet processing stage of the particular node. As the first packet is processed by each packet processing stage, the particular node generates trace monitoring results to be provided to the controller for analysis.

In some embodiments, the packet processing stages include an ingress stage, a firewall stage, a routing stage, a quality of service (QoS) stage, a network address translation (NAT) stage, and an egress stage. The ingress stage, in some embodiments, is responsible for determining whether packets received at the particular node belong to a packet flow that is marked for trace monitoring and whether these packets match at least one trace monitoring rule. When a packet matches at least one trace monitoring rule in some embodiments, the ingress stage marks the packet (e.g., sets a flag on the packet) in order to identify the packet to the remaining packet processing stages as a packet that should be trace monitored. In addition to the trace monitoring rules, some embodiments also define a set of exceptions specifying thresholds, which, when met, are indicative of an anomaly. For example, some embodiments define exception rules specifying a threshold for a number of dropped packets.

As each of the packet processing stages processes a packet marked for trace monitoring by the ingress stage, they generate trace monitoring data and provide this data to a trace monitor agent executing on the particular node, according to some embodiments. The trace monitor agent, in some embodiments, aggregates the received data and provides aggregated trace monitoring results on a per-flow basis to the controller for analysis. In some embodiments, the trace monitor agent provides the results to the controller via a control plane of the particular node on which the trace monitor agent executes. The trace monitor agent only provides the trace monitoring results to the controller after trace monitoring for a packet flow has been completed on the node (e.g., after a number of packets specified for trace monitoring have been processed), according to some embodiments.

Some embodiments also include a hierarchical order of expansion for anomaly detection. In other words, the controller can generate trace monitoring rules in a hierarchical order so that dynamic anomaly detection can be grouped based on, for example, customer need. At the flow level, trace monitoring rules in some embodiments can be specified to target a particular packet flow across nodes in the SD-WAN. At the application level, the controller in some embodiments targets a packet flows to or from a specific application. In some embodiments, the controller may generate trace monitoring rules at the profile level such that all nodes belonging to a specified profile receive the trace monitoring rules. Lastly, in some embodiments, the controller may generate trace monitoring rules at the enterprise level for all of the nodes in an enterprise.

After receiving trace monitoring results from a node, the controller in some embodiments analyzes the results to identify any anomalies. Also, in some embodiments, the controller determines one or more remedial actions for correcting the identified anomalies. The controller performs the one or more dynamic actions to correct the identified anomalies in some embodiments, or pushes the dynamic actions to one or more nodes to apply in order to correct the identified anomalies.

In some embodiments, the controller generates trace monitoring rules in response to receiving a notification from one or more nodes indicating anomalies have been detected on the one or more nodes. Alternatively, or conjunctively, some embodiments provide a user interface (UI) to allow users to request trace monitoring for specific packet flows, nodes, etc. In some such embodiments, after the controller has received results from the nodes (i.e., in response to having provided trace monitoring rules in accordance with a user request), it provides a display through the UI that includes a visualization of the nodes involved in the trace monitoring, their packet processing stages, and paths traversed by packets and packet flows between these nodes.

The visualization in the provided display, in some embodiments, provides tools for identifying and, in some embodiments, remediating any detected anomalies. For example, any nodes, packet processing stages, and paths for which an anomaly has been detected may appear in a color (e.g., red) that is different from another color (e.g., green) in which the nodes, packet processing stages, and paths for which no anomalies have been detected appear.

Additionally, some embodiments allow a user to select individual packet processing stages to see information (e.g., in a pop-up window) regarding the packet flow processed by the stage when the anomaly was detected as well as a description of the error or anomaly experienced on that stage. More specifically, the packet flow information includes source and destination network addresses, source and destination ports, and application ID, according to some embodiments. The remainder of the information in some embodiments includes time elapsed, and stage status (i.e., pass or fail), according to some embodiments. As mentioned above, some embodiments may also include a remedial action, selectable by the user, to correct the detected anomaly.

FIG. 1 illustrates an example embodiment of an SD-WAN (also referred to herein as a virtual network) for connecting multiple branch sites to each other and to a controller and at least one datacenter hub. As shown, the SD-WAN 100 includes a controller 110, three branch sites 120-124 that each include an edge forwarding node 130-134 (also referred herein as edge nodes or nodes), a cloud gateway 140, and a datacenter 150 with a hub 145.

The edge nodes in some embodiments are edge machines (e.g., virtual machines (VMs), containers, programs executing on computers, etc.) and/or standalone appliances that operate at multi-computer locations of the particular entity (e.g., at an office or datacenter of the entity) to connect the computers at their respective locations other nodes, hubs, etc. in the virtual network. In some embodiments, the nodes are clusters of nodes at each of the branch sites. In other embodiments, the edge nodes are deployed to each of the branch sites as high-availability pairs such that one edge node in the pair is the active node and the other edge node in the pair is the standby node that can take over as the active edge node in case of failover.

An example of an entity for which such a virtual network can be established includes a business entity (e.g., a corporation), a non-profit entity (e.g., a hospital, a research organization, etc.), and an education entity (e.g., a university, a college, etc.), or any other type of entity. Examples of public cloud providers include Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. In other embodiments, hubs like the hub 145 can also be deployed in private cloud datacenters of a virtual WAN provider that hosts hubs to establish SD-WANs for different entities.

In the example SD-WAN 100, the hub 145 is a multi-tenant forwarding element that is deployed on the premises of the datacenter 150. The hub 145 can be used to establish secure connection links (e.g., tunnels) with edge nodes at the particular entity's multi-computer sites, such as branch sites 130-134, third party datacenters (not shown), etc. For example, the hub 145 can be used to provide access from each branch site 120-124 to each other branch site 120-124 (e.g., via the connection links 160 that terminate at the hub 145) as well as to the resources 155 of the datacenter 150. These multi-computer sites are often at different physical locations (e.g., different buildings, different cities, different states, etc.), according to some embodiments. In some embodiments, hubs can be deployed as physical nodes or virtual nodes. Additionally, hubs in some embodiments can be deployed on a cloud (e.g., as a set of virtual edges configured as a cluster).

In the SD-WAN 100, the hub 145 also provides access to the resources 155 of the datacenter 150 as mentioned above. The resources in some embodiments include a set of one or more servers (e.g., web servers, database servers, etc.) within a microservices container (e.g., a pod). Conjunctively, or alternatively, some embodiments include multiple such microservices containers, each accessible through a different set of one or more hubs of the datacenter (not shown). The resources, as well as the hubs, are within the datacenter premises, according to some embodiments. While not shown, some embodiments include multiple different SaaS datacenters, which may each be accessed via different sets of hubs, according to some embodiments. In some embodiments, the SaaS datacenters include datacenters for video conferencing SaaS providers, for middlebox (e.g., firewall) service providers, for storage service providers, etc.

Additional examples of resources accessible via the hub 145, in some embodiments, include compute machines (e.g., virtual machines and/or containers providing server operations), storage machines (e.g., database servers), and middlebox service operations (e.g., firewall services, load balancing services, encryption services, etc.). In some embodiments, the connections 160 between the branch sites and the hub 145 are secure encrypted connections that encrypt packets exchanged between the edge nodes 130-134 of the branch sites and the hub 145. Examples of secure encrypted connections used in some embodiments include VPN (virtual private network) connections, or secure IPsec (Internet Protocol security) connection.

In some embodiments, multiple secure connection links (e.g., multiple secure tunnels) can be established between an edge node and the hub 145. When multiple such links are defined between a node and a hub, each secure connection link, in some embodiments, is associated with a different physical network link between the node and an external network. For instance, to access external networks in some embodiments, a node has one or more commercial broadband Internet links (e.g., a cable mode and a fiber optic link) to access the Internet, a wireless cellular link (e.g., a 5G LTE network), etc. The collection of the edge nodes, gateway, datacenter hub, controller, and secure connections between the edge nodes, gateway, datacenter hub, and controller form the SD-WAN 100.

As mentioned above, the controller 110 communicates with each of the nodes 130-134 at the branch sites 120-124, in some embodiments, to send information such as trace monitoring rules and receive information such as trace monitoring results via the connection links 170A-170C. In some embodiments, the controller 110 also provides trace monitoring rules to, and receives trace monitoring results from, the gateway 140 via the connection link 170D and the hub 145 via the connection link 170E. While illustrated as individual connection links, the links 170A-170E are sets of multiple connection links, according to some embodiments.

In addition to the connection links 170A-170E and 160, edge nodes 132 and 134 are connected via connection link 164, while edge nodes 130 and 132 are connected to the gateway 140 via connection links 162. The gateway 140 in this example is responsible for relaying information between edge nodes (e.g., edge nodes 120 and 122, which do not share a direct connection). Also, the gateway 140 in some embodiments is used to set up direct edge-to-edge connections. In some embodiments, the gateway 140 can be used to provide the edge nodes with access to cloud resources (e.g., compute, storage, and service resources of a cloud datacenter).

Figure 2:
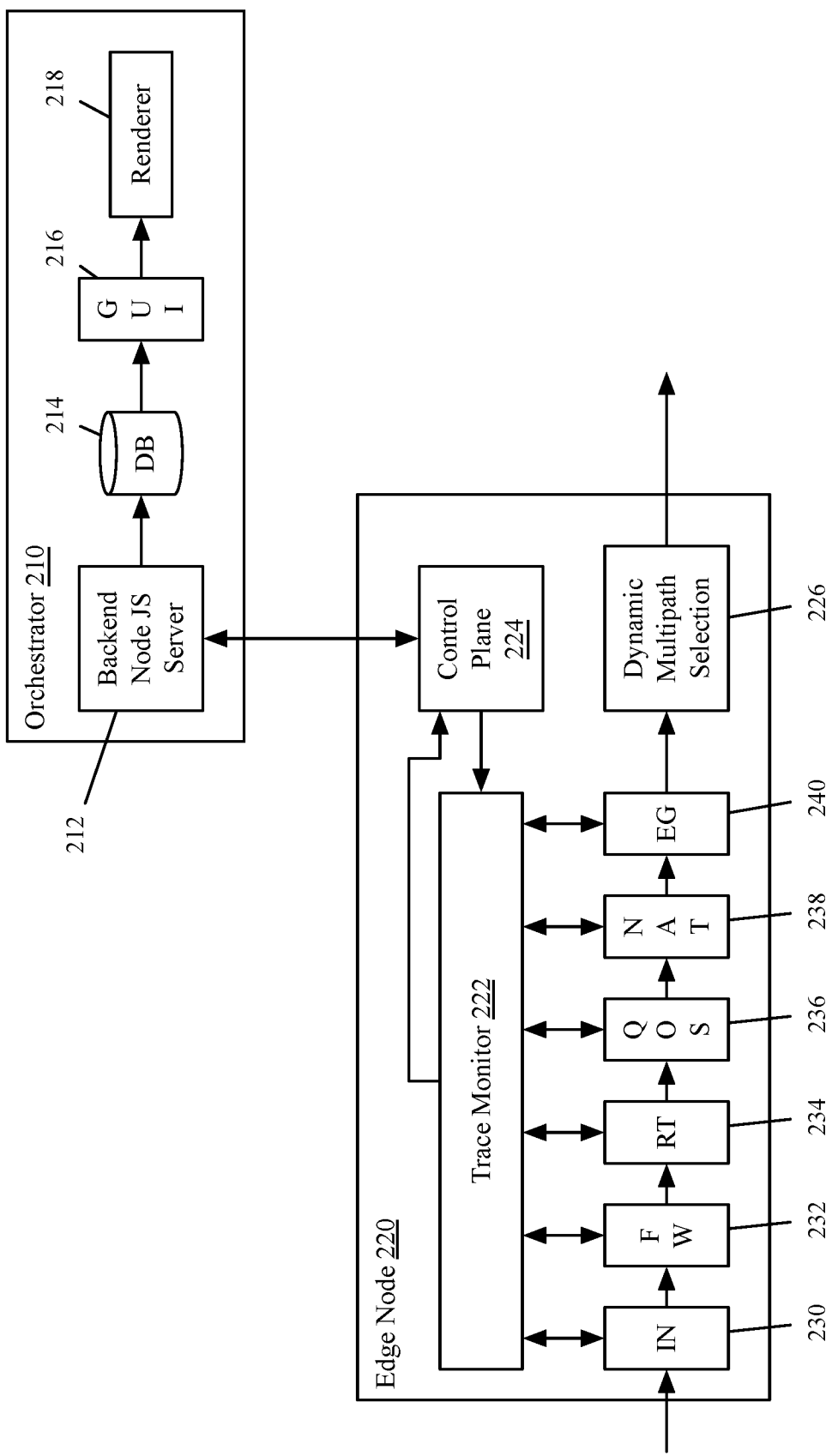
FIG. 2 conceptually illustrates a detailed view of an edge node and a controller in an SD-WAN, according to some embodiments.

In order to process packet flows to and from other elements in the virtual network (e.g., other nodes), the nodes 130-134 each include a set of packet processing stages. FIG. 2 conceptually illustrates a detailed view of an edge node and a controller in an SD-WAN. As shown, the edge node 220 includes a trace monitor 222, a control plane 224, a dynamic multipath selection module 226, and a set of packet processing stages 230-240, while the controller 210 includes a backend node server 212, a database 214, a graphical user interface 216, and a renderer 218.

The packet processing stages 230-240 include an ingress stage 230, a forwarding stage 232, a routing stage 234, a quality of service (QoS) stage 236, a network address translation (NAT) stage 238, and an egress stage 240. The ingress stage 230, in some embodiments, is configured to analyze and realize packets received at the edge node 220, as well as to match received packets to trace monitoring rules to determine whether the packet should be trace monitored. Additionally, when the ingress stage 230 determines that a packet should be trace monitored, in some embodiments, it sets a flag on the packet to indicate to the remainder of the packet processing stages 232-240 that the packet should be trace monitored.

The trace monitor 222, in some embodiments, is a data plane trace monitor that is configured to monitor the packet processing stages 230-240. In some embodiments, when an anomaly is detected during any of the packet processing stages 230-240, the trace monitor 222 sends a flow notification to the controller 210 via the control plane 224 to inform the controller of the detected anomaly. The trace monitor 222 also communicates with the controller 210 through the control plane 224 to receive trace monitoring rules and provide trace monitoring results. That is, when the trace monitor 222 receives trace monitoring data from the packet processing stages 230-240, it publishes consolidated, per-flow level trace monitoring results to the control plane 224 for collection by the backend node server 212 of the controller 210.

In some embodiments, once the backend node server 212 collects the trace monitoring results from the control plane 224, it persists the results to the database 214. Then, the GUI 216 polls the database for the trace monitoring results and calls the renderer 218 to dynamically render a flow diagram illustrating the packet processing stages of the edge node and the trace monitoring results. Alternatively, or conjunctively, the controller in some embodiments analyzes the trace monitoring results, identifies any anomalies, determines one or more remedial actions to correct the identified anomalies, and either applies the remedial action(s) itself, or pushes the remedial action(s) to one or more nodes (e.g., edge nodes, gateways, hubs, etc.) for the trace monitors of the nodes to apply.

Figure 3:
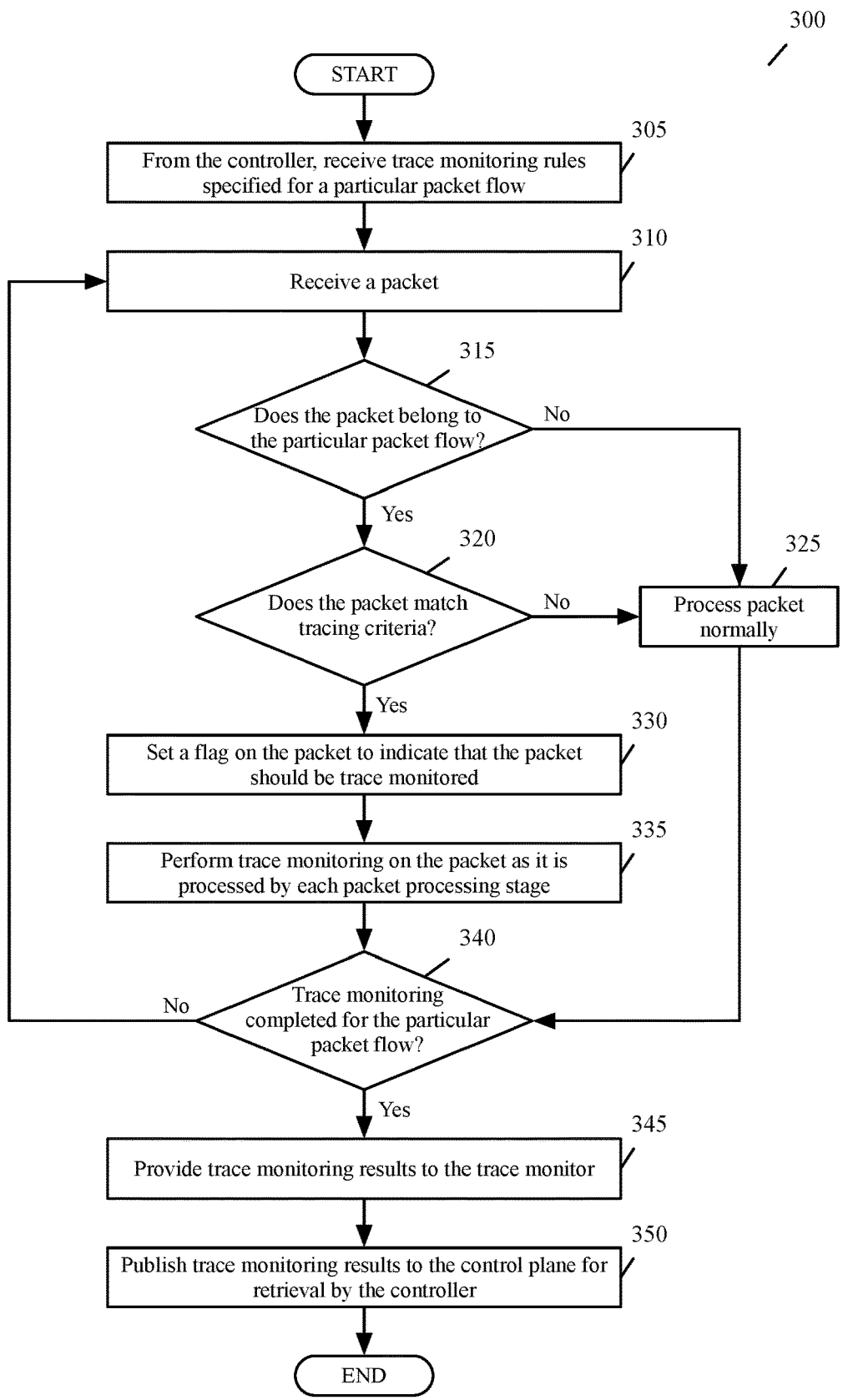
FIG. 3 conceptually illustrates a process performed by an edge node to apply trace monitoring rules, according to some embodiments.

FIG. 3 illustrates a trace monitoring process 300 performed by a node (e.g., edge node 220, gateway 140, or hub 145) in some embodiments. The process 300 starts at 305 by receiving, from a controller, trace monitoring rules specified for a particular packet flow. For example, as described above, the controller 210 provides trace monitoring rules to the trace monitor 222 of the edge node 220 via the control plane 224.

In some embodiments, the controller provides the trace monitoring rules to the edge node in response to receiving a flow notification from the edge node indicating an anomaly has been detected on the node. The node sends this flow notification, in some embodiments, based on an exception vector maintained across each of the packet processing stages of the node. The exception vector is associated with threshold limits, as mentioned above, in some embodiments. When a packet flow encounters an exception hitting threshold limit, the node (i.e., the trace monitor of the node) sends the flow notification (e.g., five tuple for the packet flow) to the controller for analysis, according to some embodiments. The controller in some embodiments, then dynamically constructs the trace monitoring rules and pushes the rules to any relevant nodes (e.g., any nodes that may process packets for this packet flow, including the node that sent the flow notification).

Next, the process receives (at 310) a packet. In some embodiments, as described above, packets received at the node are received by the ingress packet processing stage (e.g., packet processing stage 230). The process then determines (at 315) whether the received packet belongs to the particular packet flow for which the trace monitoring rules are specified. In some embodiments, for example, the trace monitoring rules will include any of the source and/or destination network address of the flow, the source and/or destination port of the flow, and an AppID of the flow (e.g., traffic type).

When the process determines (at 315) that the received packet does not belong to the particular packet flow, the process transitions to 325 to process the packet normally (i.e., without performing trace monitoring). Otherwise, when the process determines at 315 that the received packet does belong to the particular packet flow, the process transitions to 320 to determine whether the received packet matches trace monitoring criteria and should be marked for trace monitoring. For example, the trace monitoring rules will specify a number of packets in the particular packet flow that should be trace monitored.

When the process determines at 320 that the packet does not match trace monitoring criteria, the process transitions to 325 to process the packet normally, and then transitions to

340. Otherwise, when the process determines at 320 that the packet does match trace monitoring criteria, the process transitions to 330 to mark the packet for trace monitoring. For example, in some embodiments, the ingress packet processing stage sets a flag on the packet to indicate to the other packet processing stages that the packet should be trace monitored.

After the packet has been marked for trace monitoring at 330, the process performs (at 335) the trace monitoring on the packet as it is processed by each packet processing stage of the node. In some embodiments, for example, the trace monitoring can include recording the amount of time it takes to process the packet at each packet processing stage. After the packet has been processed by all of the stages, the process then determines (at 340) whether trace monitoring for the particular packet flow has been completed. In other words, the process determines whether the number of packets specified for the trace monitoring have all been processed.

When the process determines at 340 that trace monitoring for the particular packet flow has not been completed, the process transitions back to 310 to receive a packet. Otherwise, when the process determines at 340 that trace monitoring for the particular packet flow has been completed, the process transitions to 345 to provide the trace monitoring results to the trace monitor. As described above, each packet processing stage 230-240 on a node 220 collects trace monitoring data for packets that are marked for trace monitoring and provides the data to the trace monitor 222. After 345, the process publishes (at 350) consolidated, per-flow level trace results to the control plane of the node. The process then ends.

In some embodiments, as will be described further below, after the controller has retrieved the trace monitoring results from the control plane of the node, it provides one or more remedial actions to the node (i.e., via the control plane and trace monitor) to be applied by the node in order to correct any identified anomalies and/or prevent future anomalies.

Figure 4:
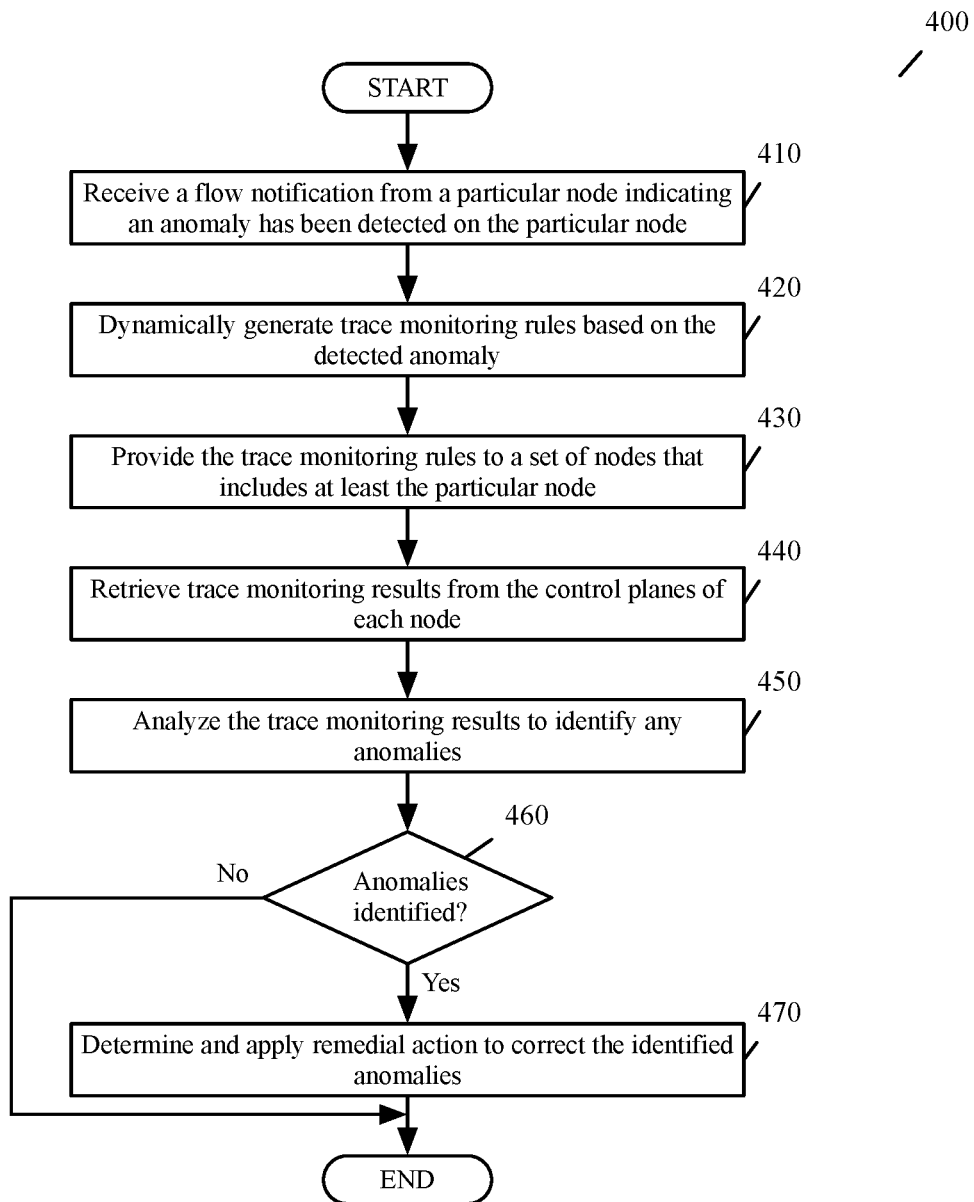
FIG. 4 conceptually illustrates a process performed by a controller to identify anomalies on edge nodes in an SD-WAN, according to some embodiments.

FIG. 4 illustrates a process performed by a controller to perform trace monitoring on a packet flow. The process 400 is performed in conjunction with the process 300 described above, in some embodiments. The process 400 starts (at 410) by receiving a flow notification at the controller from a particular node (e.g., edge node 220, gateway 140, or hub 145) indicating that an anomaly has been detected on the particular node. For example, a node in some embodiments may detect that one or more stages in the packet processing stages of the node have dropped greater than a specified threshold of packets, thus triggering a flow notification to the controller to report the anomaly.

Next, at 420, the controller dynamically generates trace monitoring rules based on the detected anomaly. Continuing with the dropped packet example above, in some embodiments, the controller may generate trace monitoring rules to trace N number of packets belonging to any flows that are processed by the particular node that is experiencing a too-large number of dropped packets. At 430, the controller provides the trace monitoring rules to a set of nodes that includes at least the particular node. As described above, the controller 210 provides the trace monitoring rules to the control plane 224 of the edge node 220, which then provides the trace monitoring rules to the trace monitor 222 to apply to the packet processing stages 230-240.

The controller then retrieves (at 440) trace monitoring results from the control plane of each node in the set of nodes. For example, in some embodiments, the backend node server 212 collects trace monitoring results from the control plane 222. Next, the controller analyzes (at 450) the trace monitoring results to identify any anomalies. Examples of anomalies in some embodiments include exceeding a threshold specified for dropped packets, exceeding a threshold time period for processing a packet, missing a route between nodes, etc.

At 460, the controller determines whether any anomalies have been identified. When the controller determines that no anomalies are identified, the process ends. Otherwise, when the controller determines at 460 that at least one anomaly has been identified, the process transitions to 470 to determine and apply a remedial action for correcting the anomaly. In one example where the controller determines that an anomaly occurred on a particular node because a route is missing, a possible remedial action that the controller can perform is refreshing the routes for the particular node to recover the missing route. In some embodiments, rather than applying a remedial action itself, the controller pushes the remedial action to one or more nodes to apply. After determining and applying the remedial action at 470, the process 400 ends.

In some embodiments, the controller performs proactive anomaly detection to predict and prevent future traffic impairments and/or performance degradation. For example, consider application traffic (e.g., a packet flow) originating from an SD-WAN edge node that traverses through a transit node before reaching a destination SD-WAN edge side network (e.g., branch-to-branch via a hub). In typical embodiments, there are multiple transit nodes in the SD-WAN for providing alternate paths to reach destinations. This topology can lead to asymmetric paths traversed the application traffic, in some embodiments, which can be detrimental to the performance of real-time and/or high-priority categories of application traffic (e.g., VoIP traffic). Accordingly, the controller, in some embodiments, can automatically detect this asymmetrical anomaly by analyzing collected trace monitoring results to identify the asymmetric path experienced by the application traffic, thus allowing for the controller to apply actions to prevent asymmetric paths for future flows of application traffic.

As mentioned above, the controller in some embodiments can set up trace monitoring rules in a hierarchical order so that dynamic anomaly detection can be grouped as per customer needs. The hierarchical order implies flow level and application level traceability, which can be further applied at a profile level (e.g., for all nodes matching a particular profile) and at the enterprise level (i.e., for all nodes in the enterprise). Based on the hierarchical level needed, the controller in some embodiments dynamically generates trace monitoring rules and pushes the rules to relevant sets of nodes in the enterprise.

Flow-level trace monitoring rules, in some embodiments, can specify full five-tuple match criteria and can be used to target a specific flow across one or more nodes. Going one step further, application-level trace monitoring rules can specify application criteria alone (e.g., application ID), and can be used to target specific application traffic across one or more nodes, according to some embodiments. At the profile-level, the controller in some embodiments sends out relevant trace monitoring rules to all nodes belonging to a particular profile or multiple profiles, while at the enterprise level, the controller in some embodiments sends out the relevant trace monitoring rules to all nodes belonging to the enterprise.

Figure 5:
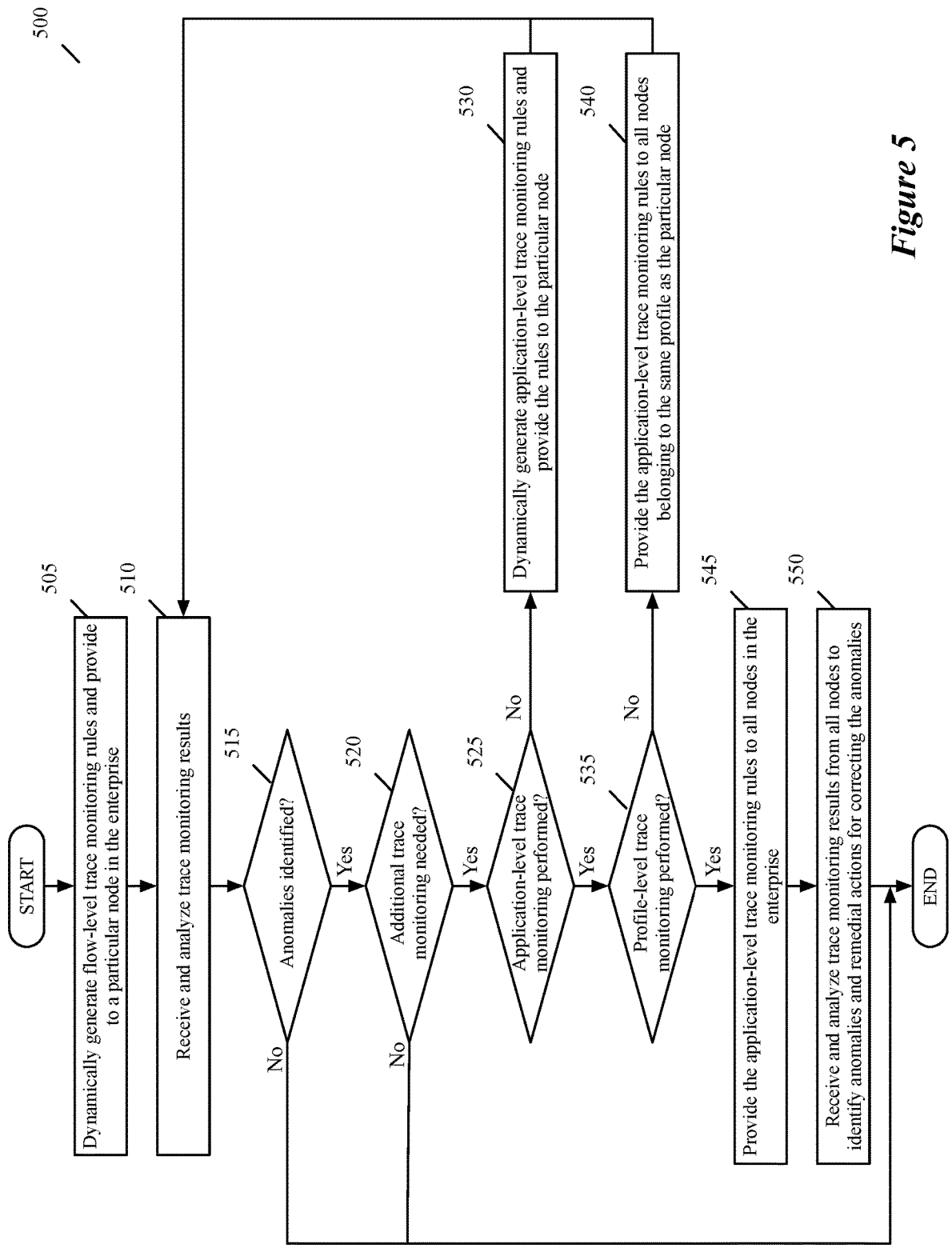
FIG. 5 conceptually illustrates a process performed by a controller to dynamically detect anomalies at various hierarchical levels in an enterprise, according to some embodiments.

FIG. 5 illustrates a process 500 performed by the controller in some embodiments to detect anomalies using the hierarchical order described above. The process 500 starts (at 505) with the controller dynamically generating flow-level trace monitoring rules and providing the rules to a particular node in the enterprise (e.g., edge node 220, gateway 140, or hub 145). The controller then receives and analyzes (at 510) trace monitoring results, and determines (at 515) whether any anomalies are identified in the received results.

When the controller determines (at 515) that no anomalies have been identified, the process ends. Otherwise, when the controller determines at 515 that one or more anomalies have been identified, the process transitions to 520 to determine whether additional trace monitoring is needed (e.g., if the identified anomaly has the potential to occur for other flows and/or at other nodes). When the controller determines (at 520) that no additional trace monitoring is needed, the process ends.

Otherwise, when the controller determines at 520 that additional trace monitoring is needed, the process transitions to 525 to determine whether application-level trace monitoring has been performed (i.e., with regard to this detected anomaly). When the controller determines (at 525) that application-level trace monitoring has not yet been performed, the process transitions to 530 to dynamically generate application-level trace monitoring rules and provide the rules to the particular node. In some embodiments, rather than generating new rules, the controller refines the flow-level trace monitoring rules so that they apply to all flows having the same application ID as the flow for which the anomaly was first detected (e.g., by removing source and destination address/port information from the rules). After 530, the process transitions back to 510 to receive and analyze trace monitoring results.

When the controller determines at 525 that application-level trace monitoring has been performed, the process transitions to 535 to determine whether profile-level trace monitoring has been performed. When the controller determines at 535 that profile-level trace monitoring has not yet been performed, the process transitions to 540 to provide the application-level trace monitoring rules to all nodes belonging to the same profile as the particular node. For example, when the particular node is a gateway, the controller in some embodiments provides the rules to all gateways in the enterprise. After 540, the process transitions back to 510 to receive and analyze trace monitoring results.

Otherwise, when the controller determines at 535 that profile-level trace monitoring has been performed, the process transitions to 545 to provide the application-level trace monitoring rules to all nodes in the enterprise. The controller then receives and analyzes (at 550) trace monitoring results received from all of the nodes to identify anomalies and remedial actions for correcting the anomalies in the enterprise. The process then ends.

FIGS. 6A-6B, 7A-7B, and 7A-7C illustrate a set of example UIs provided by a controller, in some embodiments, for allowing a user (e.g., an administrator) to manually enter a trace request and review trace monitoring results. It should be noted that while these examples are described with a limited number of edge nodes, other embodiments of the invention can be implemented for a multitude of edge nodes (i.e., thousands) in an SD-WAN. Additionally, these examples are merely illustrative and real-life implementations of the UIs described herein may include additional, fewer, or different features than those shown and described.

Figure 6A:
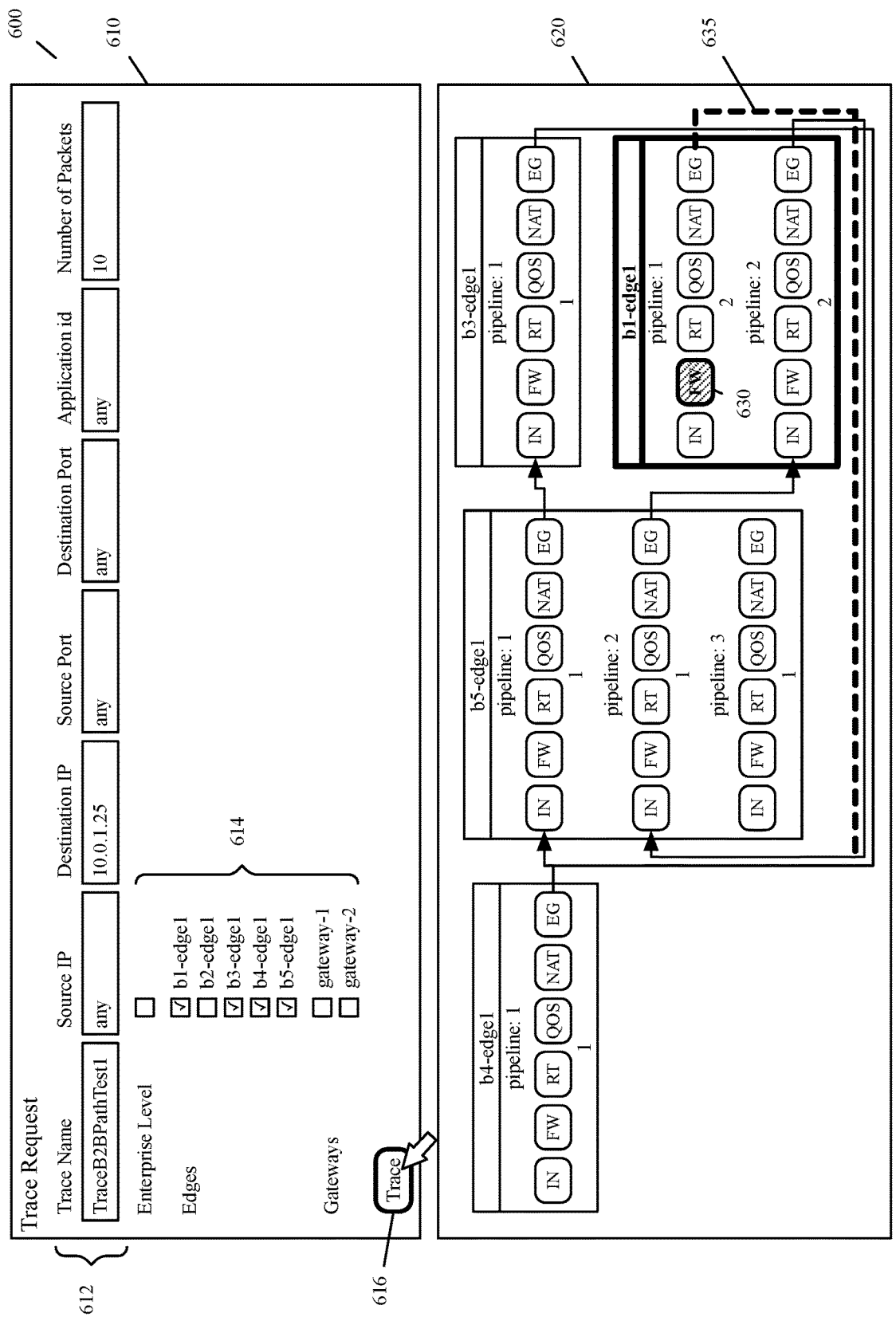
FIGS. 6A-6B illustrate a first example UI for performing trace monitoring and identifying anomalies, according to some embodiments.

FIG. 6A illustrates a first example UI 600. As shown, the UI 600 is split into two sections with the trace request 610 featured in the top half of the display and the node visualization 620 featured in the bottom half of the display. The trace request portion 610 includes a set of fillable boxes 612 that include trace name, source IP (Internet Protocol), destination IP, source port, destination port, application ID (AppID), and number of packets (i.e., a number of packets to be traced). In this example, the trace request has a trace name of "TraceB2BPathTest1" and specifies a destination IP of "10.0.1.25", while the source IP, source port, destination port, and AppID are specified as "any". Additionally, the trace request 610 specifies that 10 packets of this particular packet flow (i.e., packets with a destination IP of 10.0.1.25) should be traced.

In addition to the fillable boxes 612, the trace request portion 610 includes a set of check boxes 614 that allow a user to select specific edge nodes and gateways to perform the trace monitoring operation. The check boxes 614 also include an option to select to perform the trace monitoring operation at the enterprise level, meaning the trace monitoring rules would be provided to all nodes and gateways in the enterprise. In this example, a user has selected four edge nodes to perform the trace monitoring operation. When a user has finished filling out the trace request, selecting the "trace" button initiates the trace monitoring operation, and the results appear in the visualization portion 620.

The visualization portion 620 includes visual representations of the nodes selected to perform the trace monitoring operation (e.g., b1-edge1, b3-edge1, b4-edge1, and b5-edge1). As shown, the edge nodes b3-edge1 and b4-edge1 each include one pipeline, while the edge node b1-edge1 includes two pipelines and the edge node b5-edge1 includes 3 pipelines. Additionally, the visualization portion 620 includes routes traversed by the trace monitored packets between the edge nodes.

As shown, the edge nodes b3-edge1, b4-edge1, and b5-edge1 appear without any distinguishing features, while the edge node b1-edge1 appears with a bolded outline and the firewall stage 630 of its pipeline 1 is also bolded and darkened. The bold edge node and packet processing stage indicate that an anomaly was detected for that particular packet processing stage on that edge node, according to some embodiments. Similarly, the route 635 appears bolded and with a dashed line to indicate an anomaly was detected for that particular route, whereas the other routes are not distinguished in any way. Other embodiments may instead show the unproblematic edge nodes, packet processing stages, and routes in a first color (e.g., green), while showing the edge nodes, packet processing stages, and routes that have experienced an anomaly in a second color (e.g., red).

Figure 6B:
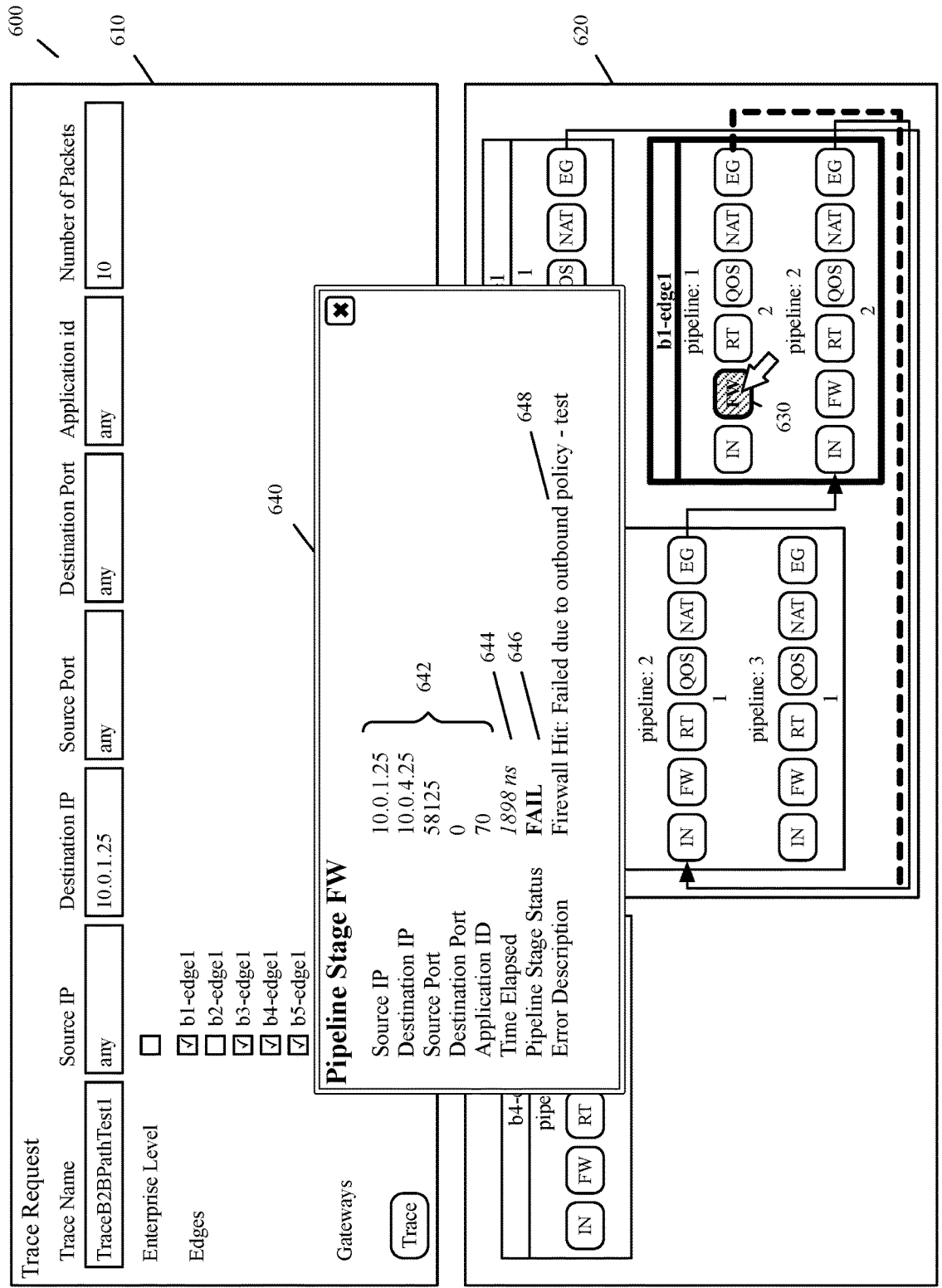

Each of the packet processing stages displayed in the UI are selectable according to some embodiments. For example, FIG. 6B illustrates the UI 600 after a user has selected (e.g., via the cursor) the firewall stage 630 of the edge node b1-edge1. The UI 600 now includes a pop-up display window 640 that includes information regarding the firewall stage 630. The window 640 includes packet flow information 642 regarding the packet flow processed by the firewall stage 630 during which the anomaly occurred. The packet flow information 642 includes the source IP "10.0.1.25" and destination IP "10.0.4.25" of the flow, the source port "58125" and destination port "0" of the flow, and the application ID "70" of the flow.

The window 640 also includes the time elapsed 644 indicating that it took 1898 ns to process the packet for which the anomaly was detected, the pipeline stage status 646 indicating the status of the firewall stage as "fail", and an error description 648 indicating that the failure was due to an outbound policy. As described above, the controller in some embodiments provides suggested remedial actions for correcting anomalies. As the error description 648 indicates that the failure (i.e., anomaly) was due to an outbound policy, no suggested remedial actions are provided.

Figure 7A:
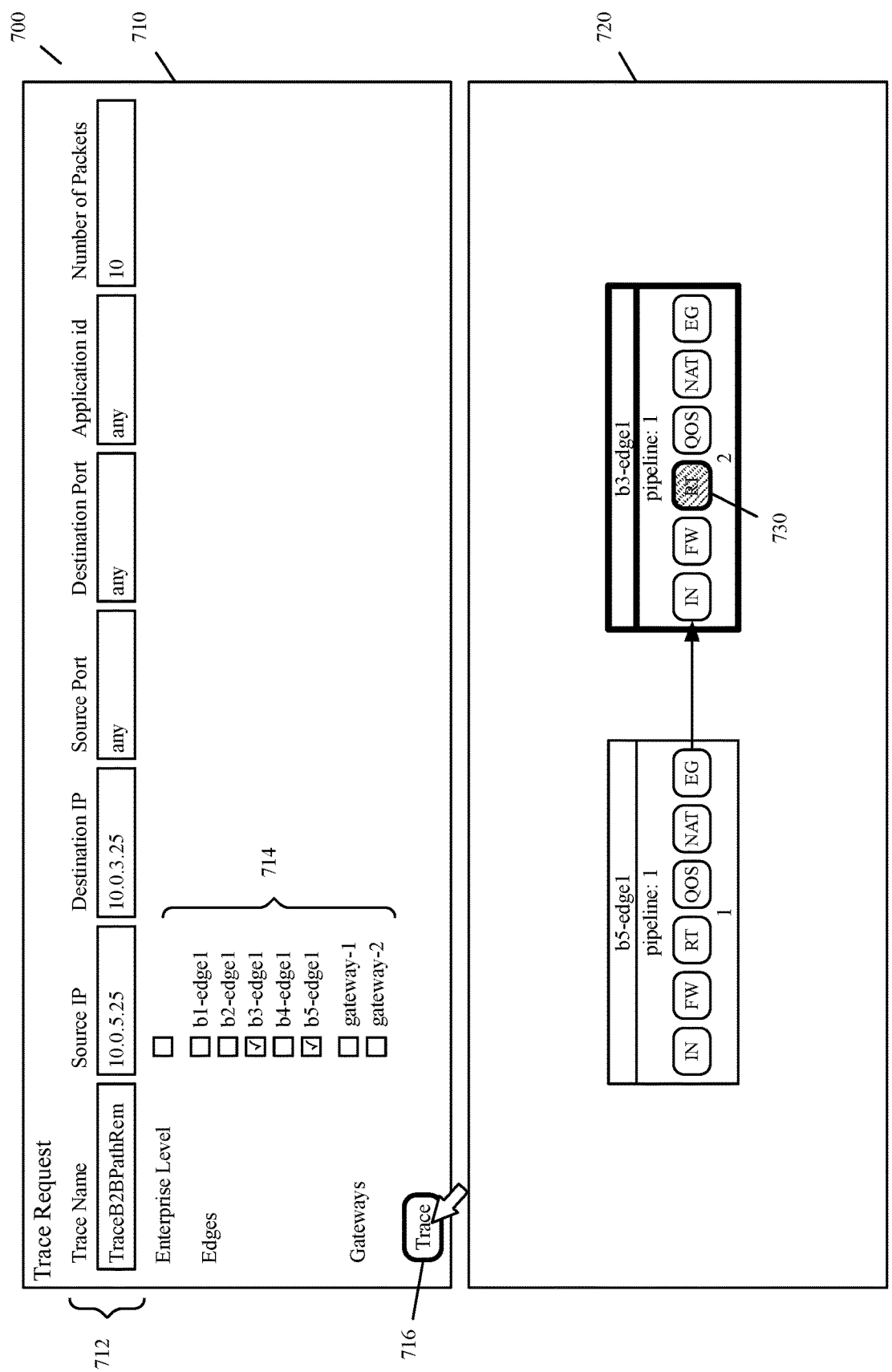
FIGS. 7A-7B illustrate a second example UI for performing trace monitoring and identifying anomalies, according to some embodiments.

FIG. 7A illustrates a second example UI 700 of some embodiments that includes a second example trace request 710 and trace results 720. The trace request 710 includes a set of fillable boxes 712 that include the trace name "TraceB2BPathRem", the source IP "10.0.5.25", the destination IP "10.0.3.25", and the number of packets "10" to be traced, while the source and destination ports and application ID are specified as "any". Also, from the check boxes 714, a user has selected the edge nodes b3-edge1 and b5-edge1 to perform the trace monitoring operation. As described for the example UI 600, when a user has finished filling out the trace request 710, selecting the "trace" button 716 initiates the trace monitoring operation, and the results appear in the visualization portion 720.

The visualization portion 720 includes visualizations of the two selected edge nodes b3-edge1 and b5-edge1, each having a single pipeline. As shown, the edge node b3-edge1 appears with a bold outline and its routing stage 730 appears darkened and with a bold outline indicating that an anomaly has been detected on the edge node b3-edge1, specifically at the routing stage 730. In order to determine the cause of the anomaly, a user may select the routing stage 730 for more information.

Figure 7B:
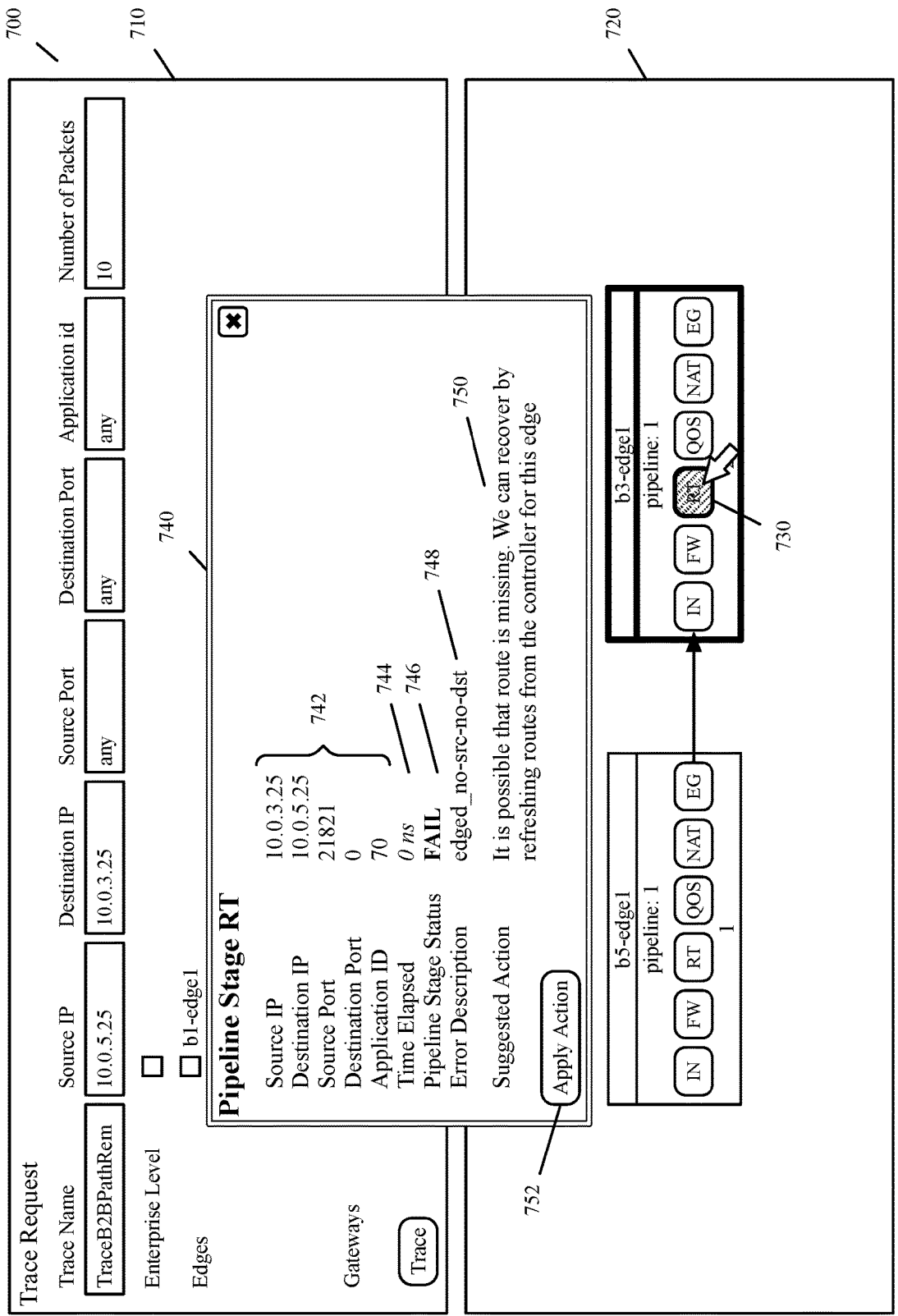

FIG. 7B illustrates the UI 700 after a user has selected the routing stage 730 (e.g., with a cursor). The UI 700 now includes the pop-up display window 740 for the routing stage 730 of edge node b3-edge1. The window 740 includes packet flow information 742 that includes the source IP "10.0.3.25", destination IP "10.0.5.25", source port "21821", destination port "0", and application ID "70". The window 740 also includes the time elapsed 744 indicating 0 ns elapsed during the processing of the packet at the routing stage 730, the pipeline stage status 746 indicating the status of the routing stage as "fail", and the error description 748 specifying "edged_no-src-no-dest", which may indicate a route is missing.

Unlike the window 640 in the example UI 600, the window 740 also includes a suggested action 750 indicating that it is possible that a route is missing and that it can be recovered by refreshing routes from the controller for the edge node b3-edge1, as well as a selectable button 752 to apply the suggested action. In some embodiments, such as when the controller generates trace monitoring rules based on a flow notification from a node, as described above, rather than based on a trace request from a user, the suggested action is automatically applied to correct the anomaly rather than relying on a command from a user.

Figure 8A:
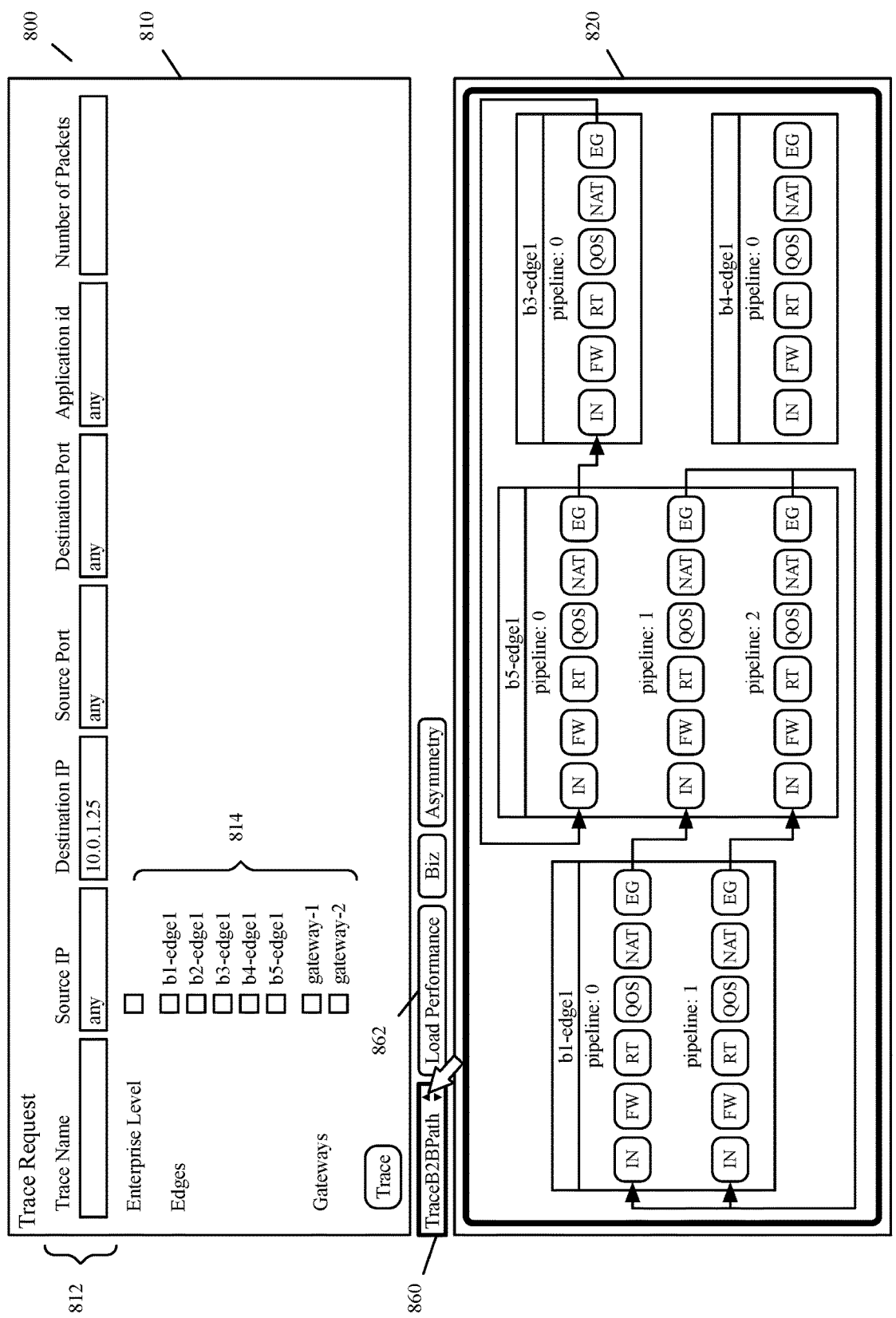
FIGS. 8A-8C illustrate a third example UI for performing trace monitoring and identifying anomalies, according to some embodiments.

FIG. 8A illustrates a third example UI 800 of some embodiments. The UI 800 includes the top trace request portion 810 and the bottom visualization portion 820. In this example, neither a trace name nor a number of packets are specified in the set of fillable boxes 812. Instead, only the destination IP "10.0.1.25" is specified, while the source IP, source and destination ports, and application ID are specified as "any". Similarly, none of the check boxes 814 are selected.

Unlike the UIs 600 and 700 described above, the UI 800 also includes a dropdown menu 860 between the top portion 810 and bottom portion 820 that allows a user to select an archived trace (e.g., a trace monitoring operation initiated by the user at a prior time). In this case, the trace "TraceB2BPath" is currently selected from dropdown menu 860, as shown. As a result, the visualization portion 820 displays a set of nodes including b1-edge1, b3-edge1, b4-edge1, and b5-edge1. Each of the edge nodes, their packet processing stages, and the routes between them appear normal in the visualization portion 820 indicating that no anomalies were detected as far as a packet flow is concerned. To determine whether there are any issues within the pipelines themselves, a user may select the load performance button 862.

Figure 8B:
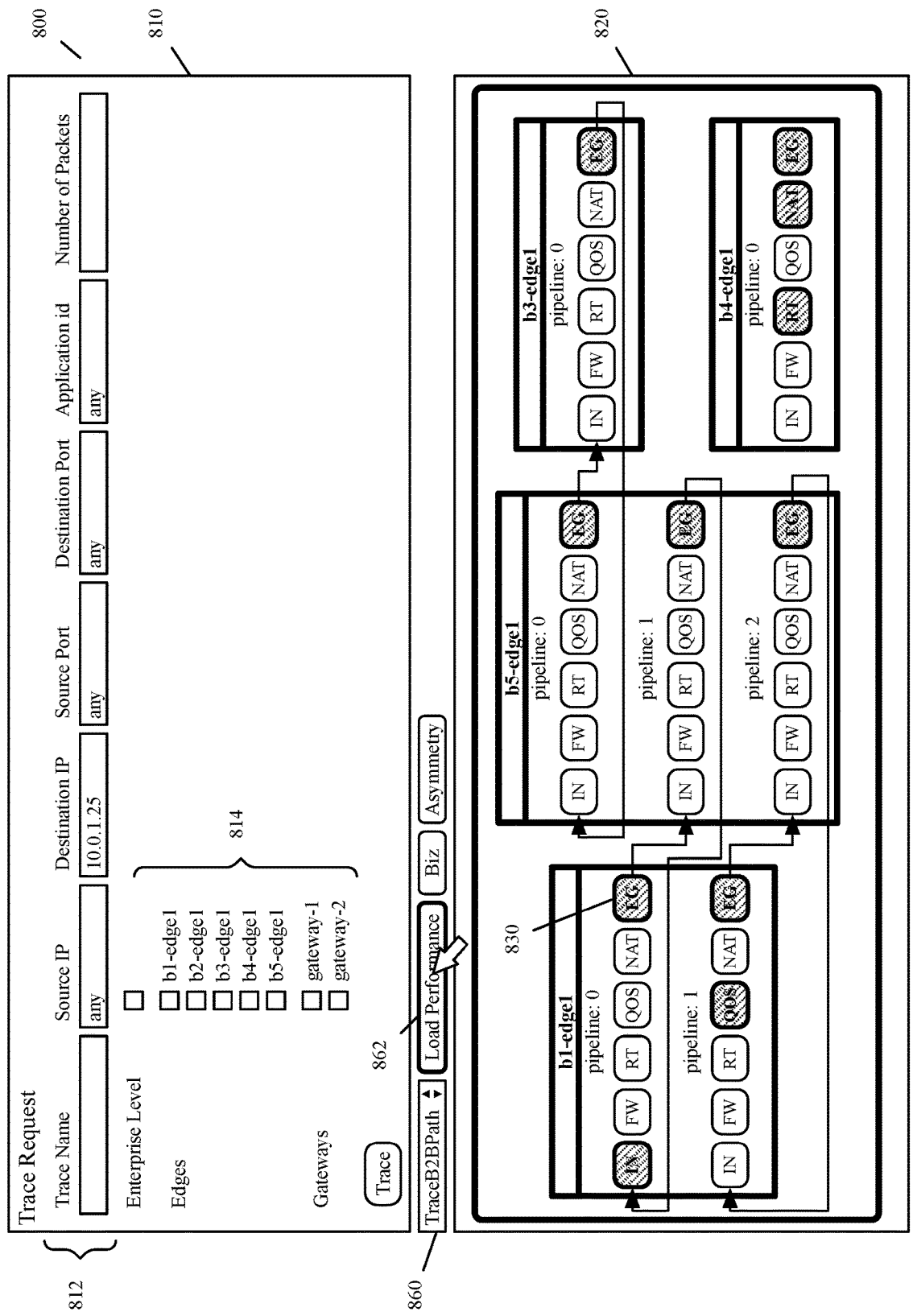

FIG. 8B illustrates the UI 800 after the load performance button 862 has been selected (i.e., as indicated by the cursor). Each of the edge nodes b1-edge1, b3-edge1, b4-edge1, and b5-edge1 now appear bold. For the edge node b1-edge1, the ingress and egress stages of the node's first pipeline are darkened and bolded, as are the QoS and egress stages of the node's second pipeline. Similarly, each of the egress stages on the nodes b3-edge1 and b5-edge1 are darkened and bolded, while the routing, NAT, and egress stages of the edge node b4-edge1 are darkened and bolded. Thus, between these 4 edge nodes, anomalies have been detected for 11 different packet processing stages. Like with the examples provided above, the packet processing stages in the UI 800 are selectable by a user.

Figure 8C:
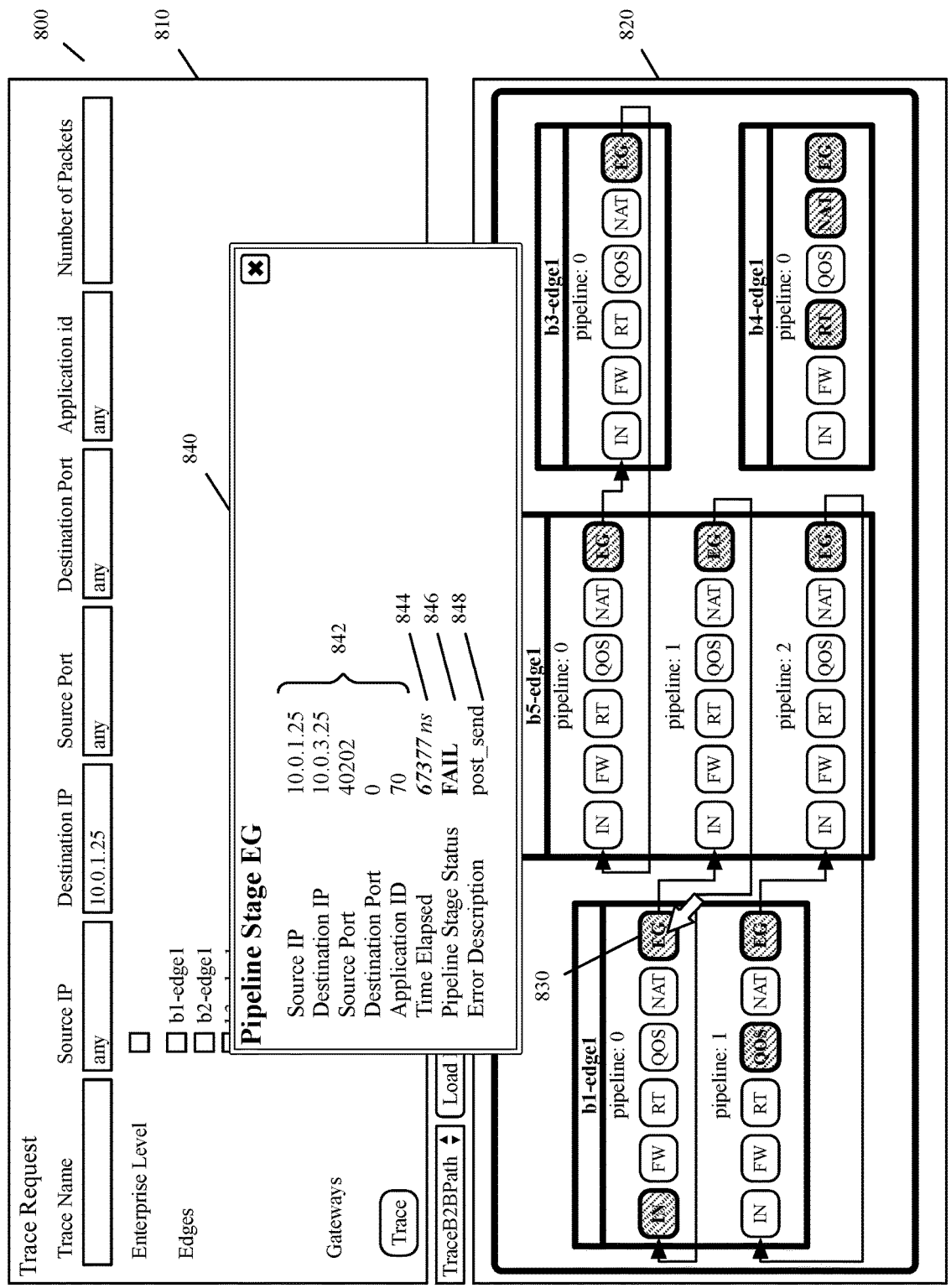

FIG. 8C illustrates the UI 800 after a user selects the egress stage 830 in the first pipeline of the edge node b1-edge1. The UI now includes the pop-up display window 840 for the egress stage 830. The window 840 includes the packet flow information 842 specifying the source IP "10.0.1.25", the destination IP "10.1.3.25", the source port "40202", the destination port "0", and the application ID "70". Additionally, the window 840 includes the time elapsed 844 indicating 67377 ns elapsed while processing a packet, the pipeline stage status 846 indicating the egress stage's status as "fail", and the error description 848 indicating the error as "post send". While embodiments of the invention may not specify whether a threshold for a particular metric has been exceeded, for the sake of clarity, the window 840 also indicates that the time elapsed 844 exceeds a threshold. Thus, there is an anomaly from a latency perspective for the egress stage 830.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 9 conceptually illustrates a computer system 900 with which some embodiments of the invention are implemented. The computer system 900 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the computer system. The permanent storage device 935, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such as random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the computer system. The input devices 940 include alphanumeric keyboards and pointing devices (also called "cursor control devices"). The output devices 945 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 9, bus 905 also couples computer system 900 to a network 965 through a network adapter (not shown). In this manner, the computer can be a part of a network of computers (such as a local area network ("LAN"), a wide area network ("WAN"), or an Intranet), or a network of networks (such as the Internet). Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third party's virtual private cloud datacenters (e.g., datacenters that the third party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method for tracing packets in a software-defined wide area network (SD-WAN) comprising a controller and a plurality of branch sites, wherein each branch site comprises at least a forwarding node comprising a set of packet processing stages that process packet flows that are forwarded through the SD-WAN, the method comprising:

at a particular forwarding node that comprises a plurality of packet processing stages:
receiving, from the controller of the SD-WAN, one or more trace monitoring rules specified for a particular packet flow, the one or more trace monitoring rules being dynamically generated based on a hierarchical order, the hierarchical order being associated with flow level and application level traceability;

determining that packets of the particular packet flow received at the particular forwarding node match at least one trace monitoring rule in the one or more trace monitoring rules;

based on the determination, directing each packet processing stage in the plurality of packet processing stages of the particular forwarding node to perform trace monitoring for the packets of the particular packet flow, each packet processing stage independently generating trace monitoring data, an anomaly detected at any packet processing stage triggering refining the one or more trace monitoring rules at the controller; and forwarding a plurality of trace monitoring results for the particular packet flow to the controller for analysis.

2. The method of claim 1, wherein the plurality of packet processing stages comprises at least one forwarding operation and at least one middlebox service operation.

3. The method of claim 1, wherein the plurality of packet processing stages comprises at least two forwarding operations.

4. The method of claim 1, wherein the plurality of packet processing stages comprises at least two middlebox service operations.

5. The method of claim 1, further comprising setting a flag on each packet of the particular packet flow to indicate that the packet should be trace monitored.

6. The method of claim 1, wherein each packet processing stage in the plurality of packet processing stages generates trace monitoring data as the packets of the particular packet flow are processed.

7. The method of claim 6, wherein the set of one or more trace monitoring rules specifies a number of packets to be traced, wherein the plurality of trace monitoring results are forwarded to the controller when the specified number of packets have been traced.

8. The method of claim 1 further comprising receiving one or more additional trace monitoring rules specified for one of (i) packet flows for a particular application, (ii) packet flows between a specified set of forwarding nodes in a plurality of forwarding nodes, and (iii) all packet flows between the plurality of forwarding nodes in the SD-WAN.

9. The method of claim 1, wherein the one or more trace monitoring rules further comprise a set of exception rules, wherein each exception rule defines a threshold value for identifying anomalous behavior on the particular forwarding node.

10. The method of claim 1 further comprising:
receiving packet and determining that the packet does not belong to the particular flow; and
processing the packet without performing trace monitoring on the packet.

11. A non-transitory machine readable medium storing a program for execution by a set of processing units, the program for tracing packets in a software-defined wide area network (SD-WAN) comprising a controller and a plurality of branch sites, wherein each branch site comprises at least a forwarding node comprising a set of packet processing stages that process packet flows that are forwarded through the SD-WAN, the program for execution at a particular forwarding node that comprises a plurality of packet processing stages and comprising sets of instructions for:

receiving, from the controller of the SD-WAN, one or more trace monitoring rules specified for a particular packet flow, the one or more trace monitoring rules being dynamically generated based on a hierarchical order, the hierarchical order being associated with flow level and application level traceability;

determining that the packets of the particular packet flow received at the particular forwarding node match at least one trace monitoring rule in the one or more trace monitoring rules;

based on the determination, directing each packet processing stage in the plurality of packet processing stages of the particular forwarding node to perform trace monitoring for the packets of the particular packet flow, each packet processing stage independently generating trace monitoring data, an anomaly detected at any packet processing stage triggering refining the one or more trace monitoring rules at the controller; and forwarding a plurality of trace monitoring results for the particular packet flow to the controller for analysis.

12. The non-transitory machine readable medium of claim 11, wherein the plurality of packet processing stages comprises at least one forwarding operation and at least one middlebox service operation.

13. The non-transitory machine readable medium of claim 11, wherein the plurality of packet processing stages comprises at least two forwarding operations.

14. The non-transitory machine readable medium of claim 11, wherein the plurality of packet processing stages comprises at least two middlebox service operations.

15. The non-transitory machine readable medium of claim 11, further comprising a set of instructions for setting a flag on each packet of the particular packet flow to indicate that the packet should be trace monitored.

16. The non-transitory machine readable medium of claim 11, wherein each packet processing stage in the plurality of packet processing stages generates trace monitoring results data as the packets of the particular packet flow are processed.

17. The non-transitory machine readable medium of claim 16, wherein the one or more trace monitoring rules specifies a number of packets to be traced, wherein the plurality of trace monitoring results are forwarded to the controller when the specified number of packets have been traced.

18. The non-transitory machine readable medium of claim 11, wherein the controller (i) analyzes the forwarded plurality of trace monitoring results and (ii) performs a dynamic action when an anomaly is identified, wherein the dynamic action auto-corrects the identified anomaly.

19. The non-transitory machine readable medium of claim 11, wherein the program further comprises a set of instructions for receiving one or more additional trace monitoring rules specified for one of (i) packet flows for a particular application, (ii) packet flows between a specified set of forwarding nodes in a plurality of forwarding nodes, and (iii) all packet flows between the plurality of forwarding nodes in the SD-WAN.

20. A forwarding node to trace packets in a software-defined wide area network (SD-WAN) comprising a controller and branch sites which include other forwarding nodes having sets of packet processing stages that process packet flows that are forwarded through the SD-WAN, the forwarding node comprising a set of packet processing stages constructed and arranged to:

receive, from the controller of the SD-WAN, one or more trace monitoring rules specified for a particular packet flow, the one or more trace monitoring rules being dynamically generated based on a hierarchical order, the hierarchical order being associated with flow level and application level traceability;

determine that the packets of the particular packet flow received at the forwarding node match at least one trace monitoring rule in the one or more trace monitoring rules;

based on the determination, direct the packet processing stages of the forwarding node to perform trace monitoring for the packets of the particular packet flow, each packet processing stage independently generating trace monitoring data, an anomaly detected at any packet processing stage triggering refining the one or more trace monitoring rules at the controller; and forwarding a plurality of trace monitoring results for the particular packet flow to the controller for analysis.

\* \* \* \* \*